United States Patent [19]
Collins

[11] Patent Number: 5,131,726
[45] Date of Patent: Jul. 21, 1992

[54] AUTOMOTIVE WHEEL COVER

[76] Inventor: Marc Collins, 200 Madonna Blvd., Tierra Verde, Fla. 33715

[21] Appl. No.: 767,461

[22] Filed: Sep. 30, 1991

[51] Int. Cl.[5] .................................................. B60B 7/12
[52] U.S. Cl. ................................. 301/37 P; 301/37 PB
[58] Field of Search ............... 301/37 R, 37 P, 37 TP, 301/37 PB, 108 R, 108 A

[56] References Cited

U.S. PATENT DOCUMENTS

| 4,995,673 | 2/1991 | DuBost | 301/37 PB X |
| 5,011,232 | 4/1991 | Itoh et al. | 301/37 PB X |
| 5,064,249 | 11/1991 | Hung | 301/37 P |

FOREIGN PATENT DOCUMENTS

| 122503 | 8/1948 | Sweden | 301/37 R |
| 1400366 | 7/1975 | United Kingdom | 301/37 TP |

Primary Examiner—Russell D. Stormer
Attorney, Agent, or Firm—Arthur W. Fisher, III

[57] ABSTRACT

An automotive wheel cover having a resilient wire element for mounting the automotive wheel cover to a wheel including a bias or spring to adapt the resilient wheel element to the specific wheel size, the bias or spring being disposed within a retainer tube slightly larger inside diameter than the resilient wire element so as to allow free movement thereof.

17 Claims, 3 Drawing Sheets

AUTOMOTIVE WHEEL COVER

BACKGROUND OF THE INVENTION

1. Field of the Invention

An automotive wheel cover having a resilient retainer ring for mounting the automotive wheel cover to a wheel including a bias or spring to adapt the resilient retainer ring to the specific wheel size.

2. Description of the Prior Art

Wheel covers of a plastic material have become popular in order to minimize the weight of the cover or to minimize the expense of making the wheel cover. However, such wheel covers are more susceptible to breakage and distortion than metal wheel covers. In particular, when the means for attaching the wheel cover to the wheel is integrally formed of plastic material with the wheel cover, the forces imposed upon the plastic retaining means can distort the cover as well as the retaining means and reduce the effectiveness of the retaining means. Moreover, when the wheel is subjected to unexpected shocks, the plastic retaining means can be extremely stressed and broken whereby the wheel cover becomes separated from the wheel.

Often mounting of the wheel cover to the wheel rim comprise attaching a spring wire or plate to the holder wall or flange portion on the back circumference of the wheel cover and engaging this spring member such as the spring wire or plate with a portion of the wheel rim.

U.S. Pat. No. 4,709,967 relates to a wheel cover comprising a plurality of stoppers disposed around the circumference of a base each having a stopper surface opposed to the inner peripheral surface of a wheel disk with a gap therebetween and a ring holder in an endless annular form having a single looped flexible portion. The wheel cover is easily fitted to the wheel disk by a small spring load.

U.S. Pat. No. 4,266,831 discloses a wheel having a wire ring supported on the inboard face thereof formed with a plurality of circumferentially spaced, radially outwardly extending, U-shaped projections designed to frictionally engage an annular surface on the wheel rim to retain the cover thereon.

U.S. Pat. No. 4,596,425 shows a wheel cover including a cover body having a base circular support integrally formed along the circumferential surface adjacent to the edge portion on the inverse side, a plurality of lock openings formed on the outer wall of the base circular support, a notch and an aperture respectively provided in the cover body, a plurality of lock devices detachably secured in the lock openings and a circular retaining ring coupled with the lock devices to ensure the support stability of the lock devices.

U.S. Pat. No. 4,603,915 teaches a wheel cover with a wire ring including circular segments constructed as a prestressed bent spring. This bent spring is received by guides mounted on the wheel cover and retained by nose-like holding members when installed in the wheel cover. After the wheel cover is mounted on the wheel rim, the bent spring attains a generally circular contour and moves away from the nose-like holding members.

U.S. Pat. No. 4,738,490 discloses a wheel cover mounting for wheel covers comprising a mounting portion positioned in axial alignment with and spaced radially inward from a facing surface portion of a vehicle wheel. A spring wire retainer ring including radially outwardly extending projections spaced circumferentially around the ring in a substantially flat plane are received through circumferentially spaced openings in the mounting portion of the wheel cover.

U.S. Pat. No. 4,740,038 relates to a wheel cover comprising a plurality of struts formed integrally on the back face circumference of the wheel cover, a wire ring is fitted into inner recesses in the struts and engagement pieces fitted from outside onto the struts to fix the wire ring to the struts.

U.S. Pat. No. 4,768,838 discloses a wheel cap comprising a wheel cap body with engagement portions to be engaged with a wheel disc and a linear elastic member mounted to the wheel cap body adapted to bias the engagement portions to press-contact with the wheel disc wherein the linear elastic member is in the form of an endless circle having a plurality of loop-like flexible portions along a circumference thereof.

U.S. Pat. No. 4,929,031 teaches a hub cap with grooves on the inner sides of a plurality of click sheets respectively. A metal ring fitted against the inner sides of the click sheets with rubber caps on two opposite click sheets. The hub cap can effectively be installed into the wheel rim with proper flexibility in a detachable manner.

U.S. Pat. No. 4,822,109 shows a vehicle wheel retention cap including a cup-shaped body with a plurality of grooved projections on the internal face of the cap body for receiving a metallic ring and a plurality of clamps injected at the internal face of the cap. The clamps which are engageable in the vehicle wheel include recesses which receive the metallic ring.

U.S. Pat. No. 4,943,122 relates to a center hub cap for vehicle wheels including a dish-like main body with hollow and substantially cylindrical projections and retainer legs. These projections and legs are formed integrally with the main body to protrude axially inwardly from the inner surface of the main body and arranged alternately with each other. The projections radially support an annular spring ring for urging the retainer legs radially outwardly toward the inner peripheral wall of a recessed center portion of the wheel and provided with shoulder portions to axially maintain the spring ring in engagement with the retainer legs.

SUMMARY OF THE INVENTION

The present invention relates to an automotive wheel cover comprising a plastic molded base having a resilient retainer means held in spaced relationship thereto by a plurality of flexible struts. The resilient retainer means and flexible struts cooperatively permit the automotive wheel cover to be mounted on the rims of wheels of various sizes.

The resilient retainer means comprises a wire element or ring and an adjustment means comprising a hollow tube and a spring or bias secured therein by a centering means. When mounted on the flexible struts, the wire element or ring is formed in a circular configuration such that opposite ends thereof are disposed within the hollow tube to engage opposite ends of the spring or bias. The inside diameter of the hollow tube is slightly greater than the outside diameter of the wire element or ring to permit the ends thereof to move freely therein.

Each flexible strut comprises an upright leg having a retainer mounting member formed on the outer end portion thereof to operatively support the resilient retainer means. The retainer mounting member includes a groove or recess disposed toward the center of the automotive wheel cover to receive the wire element or ring therein to cooperatively compress the wire element or ring and a protrusion or bead formed on the outer face hereof to engage the rim of the wheel.

When the automotive wheel cover is mounted to the wheel, the protrusions or beads engage the inner surface of a safety channel formed on the wheel to secure the automotive wheel cover to the wheel. The radial force of the resilient retainer means effectively retains the protrusions or beads within the safety channel. By changing the strength or compressibility of the spring or bias a greater range of wheel sizes maybe accommodated.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
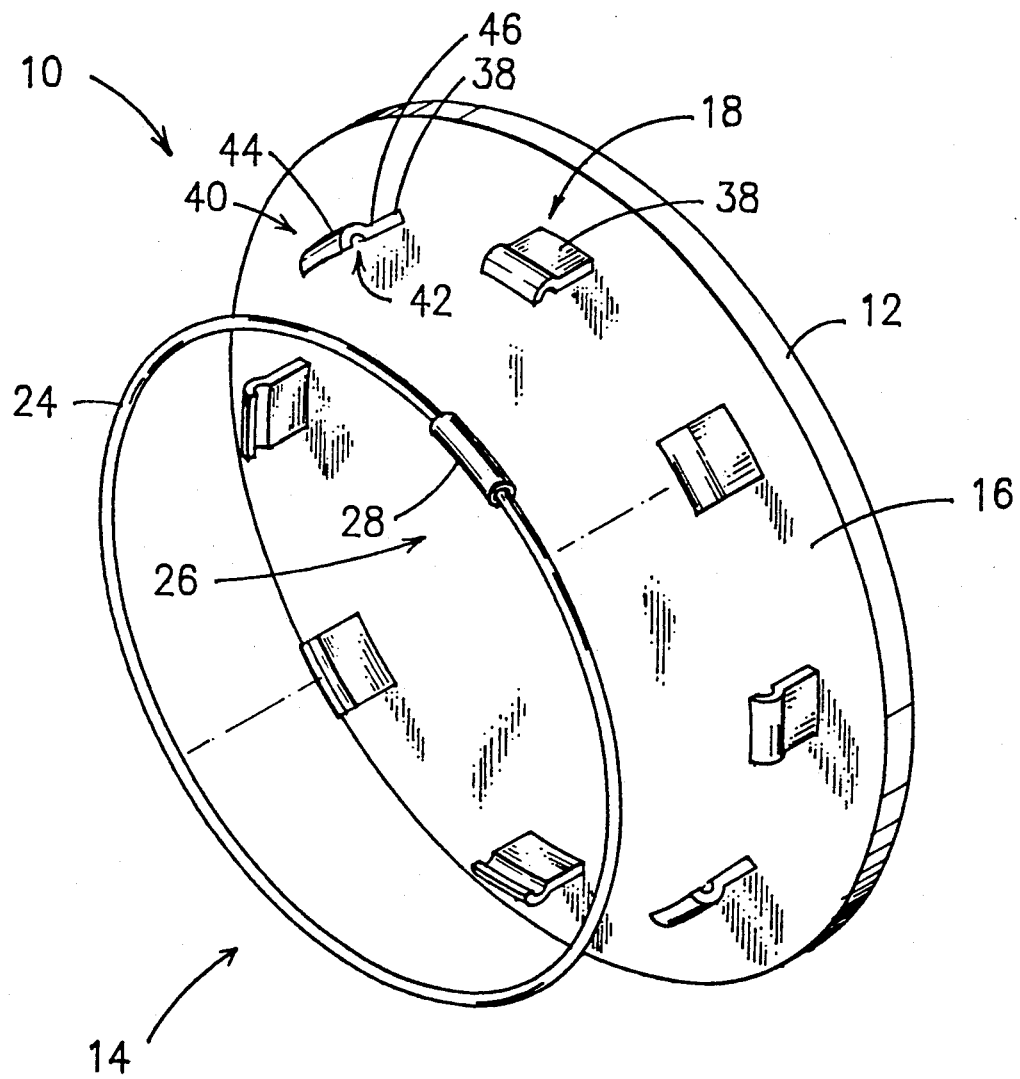
FIG. 1 is an exploded perspective view of the automotive wheel cover.
Figure 4:
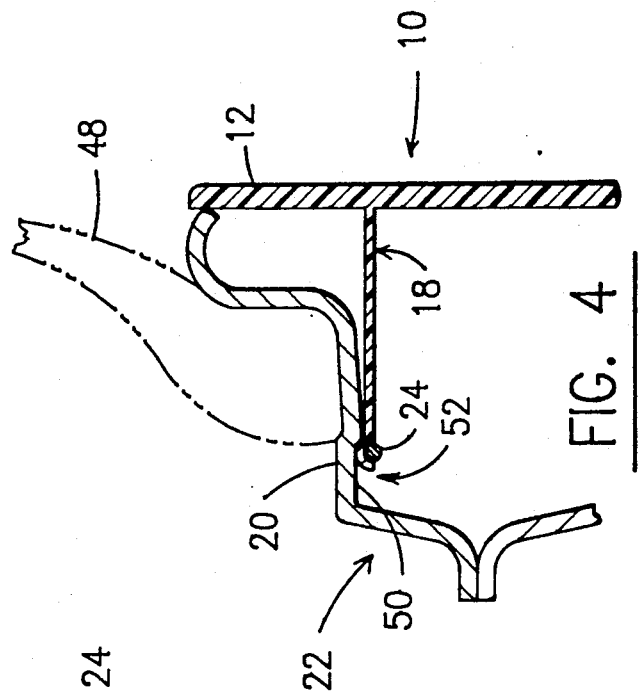
FIG. 4 is a partial cross-sectional view of the automotive wheel cover mounted on a wheel.
Figure 2:
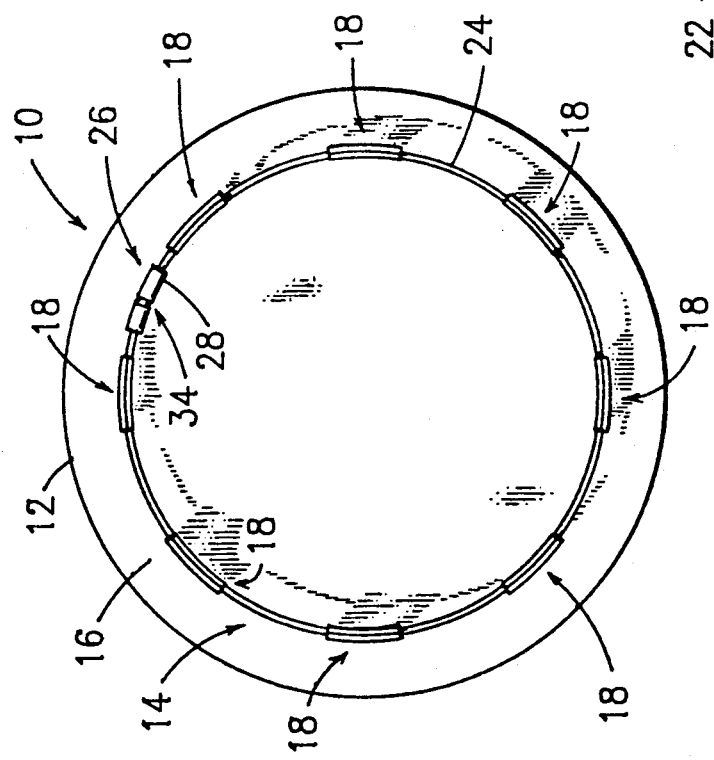
FIG. 2 is a rear view of the automotive wheel cover.

As best shown in FIGS. 1 and 2, the present invention relates to an automotive wheel cover generally indicated as 10 comprising a plastic molded base 12 having a resilient retainer means generally indicated as 14 held in spaced relationship to the inner surface 16 by a plurality of flexible struts each generally indicated as 18. As described more fully hereinafter, the resilient retainer means 14 and flexible struts 16 cooperatively permit the automotive wheel cover 10 to be mounted on the rim 20 of a wheel 22 (FIG. 4).

Figure 3:
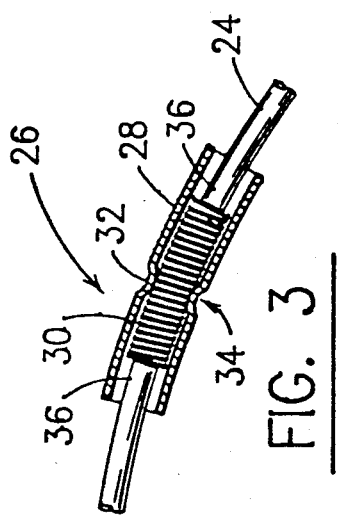
FIG. 3 is a detail view of the bias or spring disposed within the retainer tube.

As shown in FIGS. 1 through 3, the resilient retainer means 14 comprises a single continuous wire element or ring 24 having a thickness or diameter of between 3/32 of an inch and 1/8 of an inch and an adjustment means generally indicated as 26.

The adjustment means 26 comprises a hollow substantially cylindrical arcuate thin walled tube 28 from between 1¼ inches to 1¾ inches in length and a spring or bias 30 from between ¼ inch to ¾ inch in length secured therein by a centering means comprising a limit or stop 32 formed by crimping the mid-portion 34 of the hollow substantially cylindrical thin walled arcuate tube 28. When mounted on the flexible struts 18, the single continuous wire element or ring 24 is formed in a circular configuration having a diameter of substantially 13 and 11/16 inches such that opposite ends thereof each indicated as 36 thereof are disposed within the hollow substantially cylindrical arcuate thin walled tube 28 and engage opposite ends of the spring or bias 30. The inside diameter of the hollow substantially cylindrical arcuate thin walled tube 28 is slightly greater than the outside diameter of the single continuous wire element or ring 24 to permit the ends 36 thereof to move freely therein.

As best shown in FIGS. 1 and 2, each flexible strut 18 comprises an upright leg 38 having a retainer mounting member generally indicated as 40 formed on the outer end portion thereof to operatively support the resilient retainer means 14. The upright leg 38 may be integrally formed with the plastic molded base 12 or attached thereto. The retainer mounting member 40 includes a groove or recess 42 facing inwardly toward the center of the automotive wheel cover 10 to receive the single continuous wire element or ring 24 therein to cooperatively compress the single continuous wire element or ring 24 and a protrusion or bead 44 formed on the outer face 46 thereof to engage the wheel 22 as described more fully herein.

As shown in FIG. 4, when the automotive wheel cover 10 is mounted to the wheel 22 and tire 48, the protrusions or beads 44 engage the inner surface 50 of the safety channel or groove 52 formed inwardly of a retaining shoulder 54 on the wheel 22 to secure the automotive wheel cover 10 to the wheel 22. The radial force of the resilient retainer means 14 effectively press fits or retains the protrusions or beads 44 within the safety channel or groove 52. The resiliency of the flexible struts 18 and compressiblity of the single continuous wire element or ring 24 against the force of the spring or bias 30 permits mounting of the automotive wheel cover 10 on wheels 22 of different sizes. Moreover, by changing the strength or compressibility of the spring or bias 30 a greater range of wheel sizes maybe accommodated.

Figure 5:
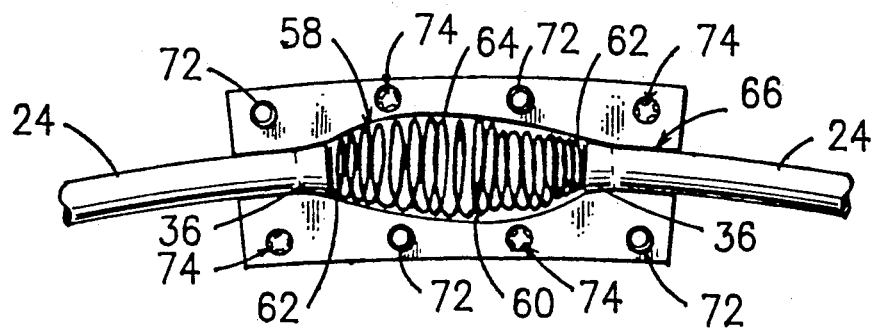
FIG. 5 is a detail view of the bias or spring disposed within the retainer housing.

FIG. 5 shows an alternate embodiment of the adjustment means 26. Specifically, the adjustment means 26 comprises a hollow arcuate barrel-shaped, bulbous housing 56 substantially 1¾ inches in length having an enlarged bulbous central chamber 58 to house a barrel-shaped, bulbous spring or bias 60 substantially ¾ of an inch in length with a 1/8 inch outside diameter at the ends each indicated as 62 and a ¼ inch inside diameter at the center 64 thereof and a reduced wire guide channel 66 disposed on opposite ends of the enlarged bulbous central chamber 58 substantially ½ inch in length to receive the corresponding end 36 of the single continuous wire element or ring 24.

Figure 6:
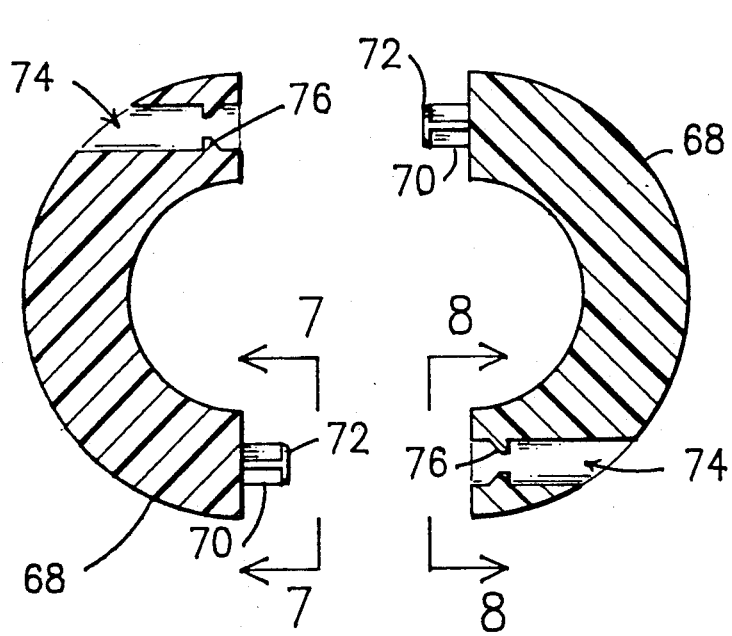
FIG. 6 is a cross-sectional view of the retainer housing of FIG. 5.
Figure 7:
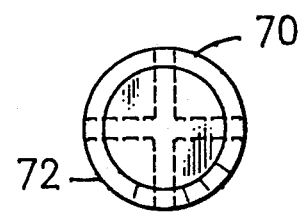
FIG. 7 is a view taken along line 7—7 of FIG. 6.
Figure 8:
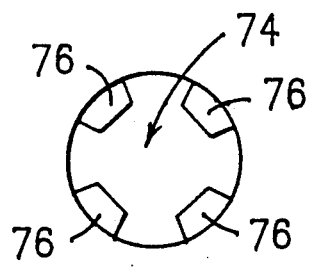
FIG. 8 is a view taken along line 8—8 of FIG. 6.
Figure 9:
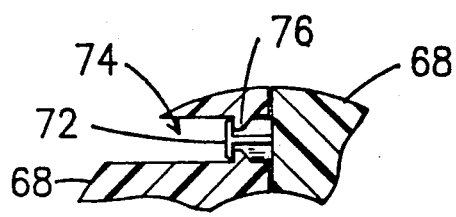
FIG. 9 is a partial detail view of the locking means.

As shown in FIG. 6, the hollow arcuate barrel-shaped, bulbous housing 56 comprises two substantially identical halves or shells each indicated as 68 each having a locking means including a plurality of protrusions 70 with an enlarged end 72 and a plurality of corresponding channels 74 having a plurality of flexible tabs each indicated as 76 disposed therein to operatively receive a corresponding aperture 74 and protrusion 70 to attach the halves or shells 68 together.

It will thus be seen that the objects set forth above, among those made apparent from the preceding description are efficiently attained and since certain changes may be made in the above construction without departing from the scope of the invention, it is intended that all matter contained in the above description or shown in the accompanying drawing.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. An automotive wheel cover to cover a wheel comprising a base including an inner surface and a resilient retainer means including a wire element and an adjustment means including a hollow tube having a biasing element disposed therein and a centering means including a limit formed on the mid portion of said hollow tube, said wire element is formed in a circular configuration such that opposite ends thereof are disposed within said hollow tube and engage opposite ends of said biasing element, said resilient retainer means being held in spaced relationship to said inner surface of said base by a plurality of flexible struts whereby said resilient retainer means exerts an outward radial force against said plurality of flexible struts such that each said flexible strut engages a portion of the wheel to secure said automotive wheel cover thereto.

2. The automotive wheel cover of claim 1 wherein each said flexible strut comprises an upright leg having a retainer mounting member formed on the outer end portion thereof to operatively support said wire element.

3. The automotive wheel cover of claim 2 wherein said retainer mounting member includes a groove or recess disposed toward the center of said automotive wheel cover to receive said wire element therein to cooperative compress said wire element.

4. The automotive wheel cover of claim 3 wherein said retainer mounting member further includes a protrusion formed on the outer face thereof to engage the wheel.

5. The automotive wheel cover of claim 1 wherein each said flexible strut comprises an upright leg having a retainer mounting member formed on the outer end portion thereof to operatively support said wire element, said retainer mounting member includes a recess disposed toward the center of said automotive wheel cover to receive said wire element therein to cooperative compress said wire element, said retainer mounting member further includes a protrusion formed on the outer face thereof to engage the wheel.

6. The automotive wheel cover of claim 5 wherein said wire element has a thickness or diameter of between 3/32 of an inch and 1/8 of an inch, said hollow tube is from between 1¼ inches to 1¾ inches in length, said biasing element is between ¼ of an inch and ¾ of an inch in length and said wire element has a diameter of substantially 13 and 11/16 inches.

7. The automotive wheel cover of claim 1 wherein said adjustment means comprises a hollow arcuate barrel-shaped housing having an enlarged central chamber to house a barrel-shaped spring and a reduced wire guide channel disposed on opposite ends of said enlarged central chamber to receive corresponding end of said wire.

8. An automotive wheel cover to cover a wheel comprising a base including an inner surface and a resilient retainer means including a wire element and an adjustment means including a hollow arcuate barrel-shaped housing having an enlarged central chamber to house a barrel-shaped spring and a reduced wire guide channel disposed on opposite ends of said enlarged central chamber to receive corresponding ends of said wire, said resilient retainer means being held in spaced relationship to said inner surface of said base by a plurality of flexible struts whereby said resilient retainer means exerts an outward radial force against said plurality of flexible struts such that each said flexible strut engages a portion of the wheel to secure said automotive wheel cover thereto.

9. The automotive wheel cover of claim 8 wherein each said flexible strut comprises an upright leg having a retainer mounting member formed on the outer end portion thereof to cooperatively support said wire element.

10. The automotive wheel cover of claim 9 wherein said retainer mounting member includes a groove or recess disposed toward the center of said automotive wheel cover to receive said wire element therein to cooperatively compress said wire element.

11. The automotive wheel cover of claim 10 wherein said retainer mounting member further includes a protrusion formed on the outer face thereof to engage the wheel.

12. The automotive wheel cover of claim 8 wherein said hollow barrel-shaped housing comprises two shells each including at least one protrusion with an enlarged end and at least one channel to operatively mate with a corresponding aperture and protrusion to attach said shells together.

13. The automotive wheel cover of claim 12 wherein each said channel has at least one flexible tab disposed therein to engage said corresponding enlarged end.

14. The automotive wheel cover of claim 8 wherein each said flexible strut comprises an upright leg having a retainer mounting member formed on the outer end portion thereof to operatively support said wire element, said retainer mounting member includes a recess disposed toward the center of said automotive wheel cover to receive said wire element therein to cooperatively compress said wire element, said retainer mounting member further includes a protrusion formed on the outer face thereof to engage the wheel.

15. The automotive wheel cover of claim 14 wherein said wire element has a thickness or diameter of between 3/32 of an inch and 1/8 of an inch, said hollow tube is from between 1¼ inches to 1¾ inches in length, said bias element is between ¼ of an inch and ¾ of an inch in length and said wire element has a diameter of substantially 13 and 11/16 inches.

16. The automotive wheel cover of claim 8 wherein said hollow barrel-shaped housing comprises two shells each including at least one protrusion with an enlarged end and at least one channel to operatively mate with a corresponding aperture and protrusion to attach said shells together.

17. The automotive wheel cover of claim 16 wherein each said channel has at least one flexible tab disposed therein to engage said corresponding enlarged end.

* * * * *